United States Patent Office 3,113,659
Patented Dec. 10, 1963

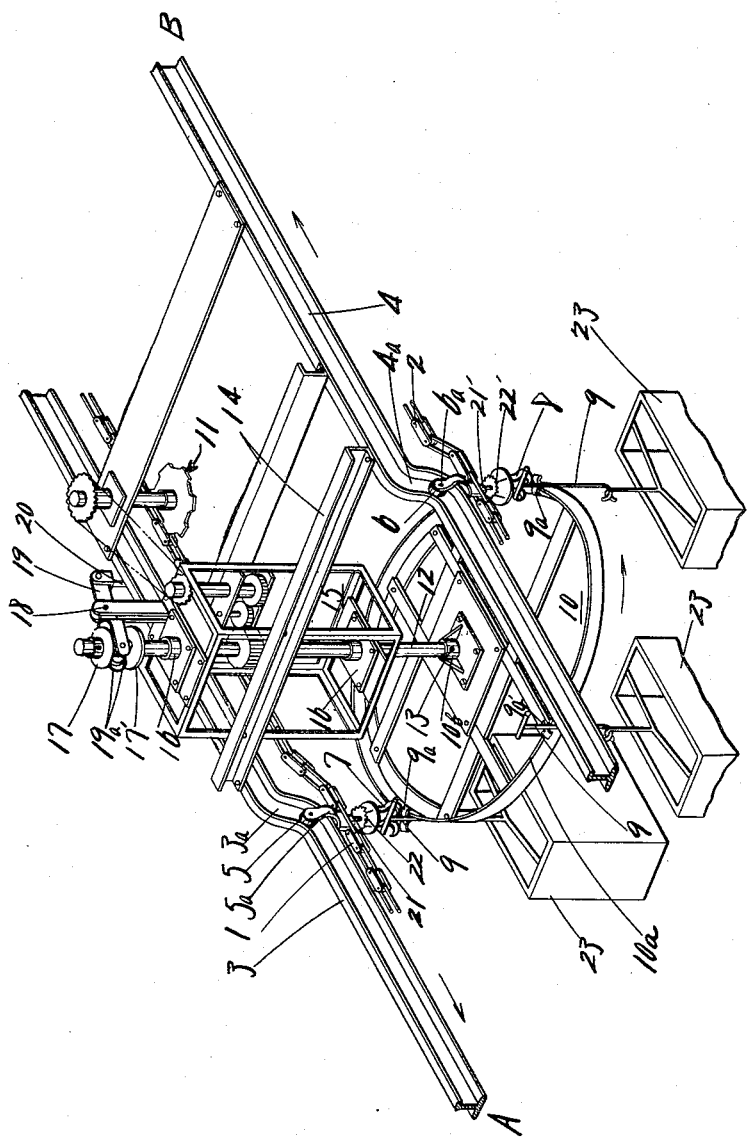

3,113,659
AUTOMATIC HANGER HOOK TRANSFER
DEVICE
Atsushi Oda, Nishinomiya City, and Seizo Ninagawa, Kyoto City, Japan, assignors to Denki Tosoki Company Limited, Osaka City, Japan
Filed Mar. 14, 1961, Ser. No. 95,739
Claims priority, application Japan Mar. 16, 1960
13 Claims. (Cl. 198—25)

The present invention relates to an improvement in an automatic hanger hook transfer device including means for transferring a hanger hook from a first trolley conveyor a second trolley conveyor at a laterally spaced location therefrom.

An object of the present invention is to make it possible to automatically transfer articles which are being carried in their suspended state from a first moving trolley conveyor on one side to a second moving trolley conveyor on the other side of a central rotary disc transfer mechanism. Another object of the present invention is to make it possible to continue operations constantly stabilized without causing any disarrangement in the control of the transfer of the hooks provided with means for hanging articles therefrom.

Conventional devices of the same nature include an endless conveyor chain with the hooks being transferred through the intermediating action of the said chain. The use of such a conveyor chain for the exclusive use in transferring, however, may not be free from disadvantages that the device becomes that much enlarged and complicated. Furthermore, in this system, transfer of hooks is directly performed between two conveyors both on the transfer side and on the transferred side, respectively. Consequently, because of the existing elongation of the conveyor chain during operation it is difficult to maintain proper timing. In consequence the transfer operation becomes impracticable. Because of such inconveniences, the conventional system has such defects that complicated controls and much labor are constantly required even after the installation of the device to prevent the said timing from becoming out of order.

In the present invention, the guide rail of the trolley conveyor on the transfer side (which indicates the trolley conveyor on the side where the hanger hooks are to be dismounted from its hangers) is downwardly inclined to the advancing direction of the conveyor on the transfer side mentioned above. On the other hand the guide rail of the trolley conveyor on the transferred side (which designates the trolley conveyor on the side where the hooks dismounted from the trolley conveyor on the transfer side mentioned above, are to be hung on its hangers) is upward inclined to the advancing direction of the conveyor on the transferred side mentioned above. Furthermore, these guide rails are so constructed that they may be on the same elevation at least at one point of the upward inclined part and the downward inclined part. In addition, a horizontal rotary disc is interposed between both conveyor lines. The disc is inscribed at its upper outer periphery with perpendiculars to the loci of the movement forming supporting guide rails for the transfer of hanger hooks which are slidably mounted on these guide rails (the perpendiculars pass through the both points mentioned above at the said downward and upward inclined parts of these guide rails, respectively). The disc is revolved at a fixed velocity ratio to the moving speed of both conveyors. Moreover, each hook suspended on the hangers of the trolley conveyors on the transfer and transferred sides, is provided with a catch which is projected on the contact side of the hook with the said rotary disc at the same elevation as the said rotary disc. This catch is arranged in such a way that it may separate a hook suspended on a hanger of the trolley conveyor on the transfer side from the said hanger at the point of contact of the rotary disc to automatically transfer the hook onto the marginal edge of the rotary disc. The hook is finally transferred by the disc onto a hanger of the trolley conveyor on the transferred side at the point of contact of the rotary disc with the second trolley conveyor.

The feature characteristic of the present invention consists in that since transfer of hooks between both trolley conveyors is accomplished only by means of a simple rotary disc, the entire body of the device may remarkably be simplified in a small scale, thereby considerably saving the floor space and the cost of equipment. Furthermore, because of the ingenious utilization of the ratio of the rotating velocity of the said rotary disc to the moving speed of the conveyors and the correlation of the descending and ascending movements of respective conveyors to the rotary disc in the present invention, hooks may securely be transferred to and from the rotary disc at the transfer point and transferred point, respectively, at all times.

Another feature characteristic of the present invention is in that because of two kinds of motive elements made to cooperate with each other, which comprise the simple aslant downward or upward movements of hangers and hooks along the inclined guide rails, and the rotary disc having the rotating velocity correlated to the speed of these movements, the hooks are readily mounted to and from the rotary disc and transferred points without being subjected to the restraint of timing as in the case where the conveyor chain for exclusive use in transfer is used. Besides, since some time intervals are allowable from commencement to completion of the suspending or separating operations of the said hooks on or from hangers, the hooks may securely be transferred even in the presence of slight discrepancy in the timing of encounter of the hooks with the hangers due to elongations of the conveyor chains in operation. Consequently, the device of the present invention hardly requires the readjustment after the installation of device in contrast with the conventional devices in which a separate conveyor chain is used as the intermediating means.

In order that the present invention may readily and clearly be understood, an embodiment of the present invention is illustrated in the accompanying drawing.

Referring now to the accompanying drawing, the conveyor chain 1 of the trolley conveyor line A on the side from which the articles are to be transferred and the conveyor chain 2 of the trolley conveyor line B on the transferred side are provided with the respective hangers 7 and 8 which are slidably mounted by means of trolleys 5 and 6 at arbitrarily fixed intervals on the guide rails 3, 4 conveniently constructed on surfaces such as ceilings. (In the accompanying drawing, only one of these hangers is shown for each conveyor chain.) Although in the accompanying drawing these conveyor chains 1, 2 and guide rails 3, 4 are only partially shown, it is to be understood that they are of the endless type in order to continuously convey the carried articles and furthermore the conveyor chains 1, 2 are circularly moved. These chains are driven by any conventionally well-known method such as by the transmission of torque of the driving shaft (not shown in the drawing) which is to be revolved through a reduction gearing by a motor arranged at a suitable position, for instance.

Between the trolley conveyor lines A and B on the transfer and transferred sides mentioned above, a wheel conveyor disc 10 is interposed in such a way that its upper outside periphery $10_a$ may be inscribed with the perpendicular planes containing the loci of movements of the hanger hooks 9 suspended on the hangers 7 and 8 respectively and the said disc may horizontally be turned. For this purpose, the fitting boss $10_b$ provided at the central part of the said disc 10 is fixed by means of a bolt 13 at the lower end of the vertical shaft 12 which is to be rotated through the transmission mechanism generally designated 11 by the movement of the conveyor chain 1 as shown in the accompanying drawing. The said vertical shaft 12 is loosely inserted through the upper and lower bearings 16, 16 for free vertical reciprocation. Furthermore, by inserting between two flanges 17 and 17' fixed at the upper end of the said shaft the fork part $19_a$ at one end of the forked lever 19 having the fulcrum of its rocking motion at the middle to the rear end and by connecting the rear end of the said lever 19 to the plunger 20 of an air cylinder (not illustrated), for instance, the said vertical shaft 12 is rotatably supported at an arbitrary elevation with the forked lever 19 mentioned above. In consequence, the vertical shaft 12 may be moved downward by the shifting of the forked lever 19 caused by the plunger 20, while the shaft is revolving the disc 10 at its lower end in an integrate body. The descending movement of the disc 10 caused by the same movement of this shaft 12 retracts the upper outside periphery $10_a$ of the disc 10 to the position lower than the locus of movement of the catch $9_a$, thereby serving to prevent the hook 9 from being subjected to the turning action of the disc 10. Said catch is projectingly fitted on the side of the hanger hook 9 facing the disc at the elevation same as the upper outside periphery $10_a$ of the disc of the elevated position at the transfer point of the hanger hook (namely, a point where the locus of movement of the hook 9 comes in contact with the upper outside periphery $10_a$ of the disc) with the intention of endowing the hanger hook with one of the factors for ensuring the perfect transfer operation, as described later. Furthermore, the fact just mentioned provides such an advantage that the transfer operation of the hook described later may be discontinued as occasion arises while the conveying operation of carried articles on the transfer conveyor and the turning operation of the disc are kept continued.

With respect to the guide rails 3, 4 corresponding to the points of contact of the upper outside periphery of the rotary disc 10 with the perpendicular planes containing the loci of movements of the hooks 9, the guide rail 3 is downward slanted in relation to the advancing direction of the conveyor chain 1 within a section $3_a$ extending at fixed distance forward and rearward of the said point of contact. On the other hand, the guide rail 4 is upward slanted in relation to the advancing direction of the conveyor chain 2 within a section $4_a$ extending at fixed distance forward and rearward of the said point of contact. Furthermore, both guide rails 3, 4 may either horizontally or slantingly be laid at arbitrary elevations in compliance with the purposes of conveying the articles, in their front and rear parts of the respective slant sections mentioned above. Although these guide rails 3, 4 are illustrated in a parallel arrangement with each other in the accompanying drawing, the present invention is not necessarily limited to such an arrangement, because, even when the position where the downward slant section $3_a$ of the guide rail 3 or the upward slant section $4_a$ of the guide rail 4 is formed, is shifted to any other position on the periphery of the disc 10 such as the position where a hook $9'_a$ is suspended on the disc 10 at the intermediate part between lines A and B in the drawing, for instance, the function of the said construction may not substantially be different from that of the construction illustrated in the drawing. Namely, this fact means that these guide rails may be laid in any directions provided the downward slant section $3_a$ and upward slant section $4_a$ mentioned above are formed in the vicinity of respective points of contact with the disc 10 of the foci of movements of the hanger hooks 9.

In the present invention, the chain conveyors 1 and 2 are to be moved at the moving speeds satisfying either of the following formulas respectively to securely achieve the intended hook transfer operations:

$$t_1 = t_2 \quad (I)$$

or $$t_1 = n \times t_2 \quad (II)$$

where $t_1$ is the time required for the chain 1 to progress at one pitch of hangers 7, $t_2$ is the time required for the chain 2 to progress at one pitch of hangers 8, and $n$ is an arbitrary integral number.

Moreover, to furthermore correctly perform the actions of automatically transferring the hook from the hanger 7 on the transfer side to the upper marginal edge of the disc 10 and to automatically transfer the hook 9 on the said disc 10 from the disc 10 to the hanger 8 on the transferred side at the point of contact of the rotary disc 10 with the focus of movement of the hook on the said transferred side, it is desirable to rotate the rotary disc 10 at a peripheral velocity 1.2–2 times as fast as the moving speed of the conveyor chain 1 (providing the moving directions of the chains 1, 2 and disc 10 as well as the facing of hangers 7, 8 are as illustrated in the drawing) or equal to 1/1.2–1/2 of the said moving speed (provided the moving directions of the chains 1, 2 and disc 10 are the same as those illustrated whereas the facing of hangers 7, 8 are inverse to those illustrated in the drawing). It, however, goes without saying that in the practice of operations of chains 1, 2 and rotary disc 10 satisfactorily meeting the requirements mentioned above it is necessary to predetermine the relative position of the hanger 8 on the transferred side to the hook on the rotary disc 10 in such a way that the hook trans-mounted from the hanger 7 on the transfer side to the said rotary disc 10 may precisely encounter with said hanger 8 on the transferred side, to which the said hook is transferred, at the transferred position (the point of contact of the rotary disc with the locus of movement of the hook on the transferred side). The determination of the prescribed position of this hanger 8 may readily be obtained empirically for instance.

Furthermore, in the accompanying drawing, 21 is the coupling lever of the hanger 7 with the trolley 5, and 21' is the coupling lever of the hanger 8 with the trolley 6. These coupling levers 21, 21' are connected with the fitting metals $5_a$ $6_a$ of the trolleys 5, 6 respectively in the horizontally rotatable construction. 22 and 22' are gear wheels fixed to these coupling levers 21 and 21'. These gear wheels 22 and 22' may turn the hangers 7 and 8 in engagement-cooperation with the fixed chains which are provided at predetermined positions in the required lengths along the guide rails 3 and 4, for instance. 23 indicates a carried article.

In the device of the present invention comprising the components mentioned above, if the hangers 7 of the line A on the transfer side and the hangers 8 of the line B on the transferred side are positioned as illustrated in the drawing, the hanger hook 9 is suspended on the hanger 7 on the transfer side, and the conveyor chains 1, 2 as well as rotary disc 10 are moved in the direction shown with arrow marks in the accompanying drawing at the prescribed speeds mentioned above respectively, the said hanger hook 9, which is carried by the movement of the chain 1 in the suspended state with the hanger 7 on the transfer side, descends along the inclination at the downward slant section $3_a$ formed on the guide rail 3 when the hook 9 together with the hanger 7 reaches the transfer point onto the disc 10. When its catch $9_a$ is caught on the upper marginal edge of the rotary disc, its descending movement mentioned above is checked. Consequently, the hanger 7 alone continuously descends and eventually the said hook 9 is fully floated up from the hanger 7 to be transferred on the disc 10. The hook 9 thus transferred is carried away from the hanger 7 in the direction shown with an arrow mark in the drawing as the disc 10 rotates. Subsequently, when the said hook 9 reaches the transferred point, the hook is lifted by the hanger 8 on the transferred side with its upward advancing movement which is simultaneously advancing to the said transferred point and is rising along the upward slant section $4_a$ of the guide rail 4, and the hook is carried away from the disc 10 by the movement of the chain 2 in its lifted state. In this way, the succeeding hooks 9 carried to the transfer point in sequence in their suspended state on the hangers 7 on the transfer side may successively be transferred to the rotary disc 10 at the said transfer point, and then securely be transferred to the hangers 8 on the transferred side, to which it is intended to transfer the said hooks 9, at the transferred position without hinderance.

In the practice of the hook transfer operation by the use of the device of the present invention described above, all of the hangers 8, . . ., on the transferred side may precisely encounter with respective hooks 9, . . ., which are carried from the conveyor line A to the transferred point by the rotary disc 10 in the way as described above in case the ratio of moving speed of the conveyor chain 2 on the trans-mounted side to that of the conveyor chain 1 on the transfer side is set on the base of the Formula I mentioned above, and consequently each hook may be transferred on each hanger 8. On the other hand, when the ratio mentioned above is established in accordance with Formula II, the hooks 9 moved to the transferred point may be encountered with the hangers 8 at intervals at $n$-pitches at the said point and consequently, individual hooks may be transferred on the hangers 8 at intervals of $n$-pitches.

In the present invention, it is possible to automatically return the hooks, transferred from the conveyor line A to the conveyor line B, to the hangers on the original conveyor line A, from which the hooks were previously separated, through a horizontal rotary disc additionally provided which has substantially the same functions as the horizontal rotary disc 10 mentioned above, by separately interposing the said additional rotary disc between the conveyor lines A and B and by slanting the sections of both guide rails in the vicinity of the points of contact with the said additional rotary disc in conformity to the embodiment described above.

It is to be understood that there are many variations and modifications within the scope and spirit of the essentials of the present invention apart from the embodiment mentioned above and the attached drawing.

We claim:

1. An article transfer apparatus comprising, a first conveyor, a conveyor guide alongside said first conveyor, a hanger connected to said conveyor for movement with said first conveyor but being reciprocable in a plane distinct from the path of said first conveyor movement, said hanger having a portion operatively associated with said conveyor guide and guided thereby for upward and downward reciprocation, a second disc conveyor having a rim movable through a path intersecting said first conveyor and arranged in vertical alignment with said first conveyor at such point of intersection, a hanger hook member for supporting an article therefrom, said hanger hook member having a portion engageable wtih said hanger upon movement of said hanger hook member with said first conveyor in an opposite direction and having a catch portion engageable on said rim to support said hanger hook member on said second disc conveyor for movement therewith, said conveyor guide including a portion at the point of intersection of said first conveyor and second disc conveyor to cause reciprocation of said hanger and to effect lifting of said hook member off said hanger and positioning on said rim upon downward movement of said hanger and to effect lifting of said hanger hook member off said rim and connecting of said hook member to said hanger upon upward reciprocation of said hanger.

2. An article transfer apparatus according to claim 1, wherein said hanger includes a horizontally projecting portion, said hook member including a hook portion adapted to engage over the horizontally extending portion of said hanger.

3. An article transfer apparatus according to claim 1, wherein said second conveyor includes a rotatable disc.

4. An article transfer apparatus according to claim 3, including means for rotating said disc and moving said first conveyor in timed relationship.

5. An article transfer apparatus according to claim 4, wherein said means for rotating said disc and moving said first conveyor include disengageable means for disconnecting the drive of said rotatable disc.

6. An article transfer apparatus according to claim 1, including a third conveyor disposed to move alongside said first conveyor, said second conveyor including a member movable between said first and third conveyors.

7. An article transfer device according to claim 6, including third conveyor drive means, a second hanger member connected to said third conveyor, a second hook member adapted to be connected to said second hanger member, said hanger member having a portion operatively associated with said second conveyor guide and reciprocable thereby upwardly and downwardly at the point of intersection of said second conveyor therewith to effect transfer of said hook member from and to said second conveyor in the same manner as from and to said first and second conveyors.

8. An article transfer apparatus according to claim 1, wherein said hanger includes a rotatable portion.

9. An article transfer apparatus according to claim 8, including gear means disposed along said first conveyor to rotate said hanger whereby to effect rotation of an article held by said hook member on said hanger.

10. An articles transfer apparatus, comprising a first conveyor including a movable chain member, a hanger connected to said chain, a guide rail disposed above said chain, said hanger having a portion in engagement therewith, said guide having a portion of changed elevation which acts upon said hanger to shift said hanger vertically while it is maintained in connection with said chain, a second conveyor having the same elements as said first conveyor and disposed at a spaced location from said first conveyor, a rotatable transfer disc member having an outer rim portion movable along a circular path to intersect each of said first and second conveyors at the location of the change in elevation of the respective guides; said first and second conveyors adapted to place an article on said rotating disc member when said hanger member and said conveyor are moved in one direction and to lift an article from said rotating disc member when said conveyor and said hanger are moved in an opposite direction.

11. An article transfer apparatus according to claim 10, including means supporting said disc member to permit vertical adjustment thereof for movement into and out of a plane of cooperative, operative association with said first and second conveyors.

12. An article transfer apparatus according to claim 1, wherein said second disc conveyor may be displaced vertically, means supporting said second conveyor for vertical movement.

13. A station for automatically transferring materials from one moving conveyor system to the other moving conveyor system, comprising a first fixed guide rail having a portion of changed elevation, a first conveyor chain having a plurality of material hangers suspended therefrom at predetermined spaced locations and moving along said guide rail, a second conveyor chain having a plurality of material hangers suspended at predetermined spaced locations and moving along said guide rail, motive means for driving said first and second conveyor chains, a rotatable disc fixed to said guide rails, and motive means for rotating said disc in such a manner that the rotating rim of said disc forms the first transfer point underneath and tangentially to the portion of changed elevation of the first guide rail and the second transfer point underneath and tangentially to the portion of changed elevation of the second guide rail, so that each of the materials being brought to the station by means of the first conveyor system is mounted in succession onto the rim of the rotating disc when the material moves down the portion of changed elevavtion of the first guide rail, and each of the materials brought in succession to the second transfer point by means of the rotating disc is picked up in succession by means of each of the material hangers as suspending from the second conveyor chain when the material hanger moves up along the portion of changed elevation of the second guide rail.

References Cited in the file of this patent

UNITED STATES PATENTS

| | | |
|---|---|---|
| 2,771,175 | Dacosta | Nov. 20, 1956 |
| 2,949,996 | Tonelli | Aug. 23, 1960 |
| 3,006,453 | Tonelli | Oct.. 31, 1961 |